(12) United States Patent
Kwag et al.

(10) Patent No.: US 8,552,120 B2
(45) Date of Patent: Oct. 8, 2013

(54) GRAFTED AND FUNCTIONALIZED HIGH 1,4-TRANS POLYBUTADIENE WITH AROMATIC ORGANOSULFUR COMPOUND

(75) Inventors: Gwang Hoon Kwag, Daejeon (KR); Hoochae Kim, Daejeon (KR); Seung Hwon Lee, Daejeon (KR); Hwieon Park, Daejeon (KR); Hyung Kyu Choi, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 1030 days.

(21) Appl. No.: 12/560,784

(22) Filed: Sep. 16, 2009

(65) Prior Publication Data

US 2010/0081770 A1 Apr. 1, 2010

(30) Foreign Application Priority Data

Sep. 29, 2008 (KR) .................. 10-2008-0095521

(51) Int. Cl.
*C08C 19/20* (2006.01)
*C08C 19/28* (2006.01)

(52) U.S. Cl.
USPC .......... 525/332.4; 525/332.6; 525/331.9; 525/333.2; 525/343; 525/350; 526/335

(58) Field of Classification Search
USPC ............ 525/332.4, 332.6, 331.9, 333.2, 343, 525/350
See application file for complete search history.

(56) References Cited

U.S. PATENT DOCUMENTS

| | | | |
|---|---|---|---|
| 2,979,488 A * | 4/1961 | Carpenter .................. 525/333.1 |
| 5,025,059 A | 6/1991 | Mouri et al. |
| 5,089,574 A | 2/1992 | Castner |
| 5,448,002 A | 9/1995 | Castner |
| 5,626,697 A | 5/1997 | Sandstrom et al. |
| 5,753,761 A | 5/1998 | Sandstrom et al. |
| 5,834,573 A | 11/1998 | Castner |
| 6,310,152 B1 | 10/2001 | Castner |
| 6,581,659 B1 | 6/2003 | Zanzig et al. |
| 6,608,154 B2 | 8/2003 | Halasa et al. |
| 6,617,406 B2 | 9/2003 | Castner |
| 6,765,063 B2 | 7/2004 | Sandstrom et al. |

FOREIGN PATENT DOCUMENTS

| | | |
|---|---|---|
| JP | 46-2833 | 1/1971 |
| KR | 10-2009-0016983 | 2/2009 |

OTHER PUBLICATIONS

Natta, G. et al.: "Thermodynamic Data on Transtactic Polybutadiene", *Stereospecific Polymers*, Jan. 1963, pp. 42-43.

* cited by examiner

*Primary Examiner* — Roberto Rabago
(74) *Attorney, Agent, or Firm* — Frommer Lawrence & Haug LLP; Ronald R. Santucci

(57) ABSTRACT

The present invention relates to a process of preparing 1,4-trans polybutadiene grafted with an aromatic organosulfur compound, the process comprising (a) preparing 1,4-trans polybutadiene by polymerizing 1,3-butadiene or butadiene derivatives in a nonpolar solvent in the presence of a particular catalyst, and (b) preparing the 1,4-trans polybutadiene grafted with an aromatic organosulfur compound by reacting the trans polybutadiene with an aromatic organosulfur compound. The organosulfur molecule in the molecular chain minimizes ultra high molecular weight fraction and narrows the molecular weight distribution, thereby enabling this polymer to show improved processability and tensile properties.

8 Claims, 9 Drawing Sheets

GRAFTED AND FUNCTIONALIZED HIGH 1,4-TRANS POLYBUTADIENE WITH AROMATIC ORGANOSULFUR COMPOUND

CROSS-REFERENCE TO RELATED APPLICATION

This application claims under 35 U.S.C. §119(a) the benefit of Korean Patent Application No. 10-2008-0095521 filed Sep. 29, 2008, the entire contents of which are incorporated herein by reference.

BACKGROUND (a) Technical Field

The present invention discloses a functionalized aromatic organosulfur trans polybutadiene comprising aromatic organosulfur compound chemically bound to the polymeric chain. In particular, high 1,4-trans polybutadiene is prepared in the presence of a particular catalyst, and an aromatic organosulfur compound is directly bound to the polybutadiene. A high 1,4-trans polybutadiene comprises the aromatic organosulfur compound bound to the end of the polymeric chain. The organosulfur molecule existing in molecule chain decreases ultra high polymer region and narrows molecular weight distribution, while remarkably improving processability and physical properties. This results in uniform crosslinking density, thus improving processability, elasticity and mechanical properties if it is used in preparing a rubber composition. Further, it inhibits gelation by preventing oxidation-reduction reaction that may be caused by metals such as cobalt.

(b) Background Art

The technology for preparing 1,4-trans polybutadiene by using butadiene as a monomer has long been known (Rubber Plast. Age, 1963, 44, 42), where butadiene is polymerized into 1,4-trans polybutadiene in the presence of Ziegler-Natta catalyst comprising vanadium compound and alkyl aluminum. This catalyst provides trans-polybutadiene having a relatively high melting point (Tm) of 70-130° C., and the polybutadiene needs to go through with an aging process at high temperature before being mixed with other rubbers or fillers. Beside the vanadium catalyst, other catalysts have also been reported for the manufacture of 1,4-trans polybutadiene.

Japanese patent application No. 67187, which was filed in 1967, discloses a process of preparing polybutadiene with the trans content of 75-80% in the presence of a combined catalyst comprising a cobalt compound, organoaluminum and phenol.

U.S. Pat. No. 5,089,574 discloses a process of preparing 1,4-trans-polybutadiene by the 1,3-butadiene polymerization in the presence of a catalyst comprising cobalt carboxylate, alkylphenol, organoaluminum and $CS_2$. In particular, molecular weight was controlled by using $CS_2$ in this catalyst system. U.S. Pat. No. 5,448,002 discloses a process of preparing 1,4-trans-polybutadiene by the 1,3-butadiene polymerization in the presence of a catalyst comprising cobalt carboxylate, alkylphenol, dialkylsulfoxide and organoaluminum. In particular, molecular weight was controlled by using dialkylsulfoxide in this catalyst system.

U.S. Pat. Nos. 6,310,152 and 6,617,406 disclose a process of preparing 1,4-trans-polybutadiene by the 1,3-butadiene polymerization by using a mixture of cobalt carboxylate, para-alkylphenol or para-alkylphenol and ortho-alkylphenol in combination with organoaluminum as a catalyst. U.S. Pat. No. 5,834,573 discloses a process of preparing 1,4-trans-polybutadiene by the 1,3-butadiene polymerization by using cobalt (oxidation state: +3) acetylacetonate, alkylphenol and organoaluminum as catalysts.

U.S. Pat. Nos. 5,025,059 and 6,608,154 disclose the trans-polybutadiene polymerization by using barium thymolate/trialkylaluminum/alkyl lithium.

The application of 1,4-trans polybutadiene to tire manufacture was disclosed in U.S. Pat. Nos. 5,025,059 (1991), 5,626,697 (1997), 5,753,761 (1998), 6,581,659 and 6,765,063.

The conventional trans polybutadiene has the following drawbacks: (a) relatively high gel content and molecular weight; (b) requirement of pre-heating polymer to a temperature above a melting point by using an oven, etc.; and (c) poor compatibility with other rubbers.

SUMMARY OF THE DISCLOSURE

The present invention relates to a trans-polybutadiene comprising an aromatic organosulfur compound bound to a polymeric chain where the function of the aromatic organosulfur compound is maximized.

Accordingly, the present invention has overcome the aforementioned problems of the conventional trans-polybutadiene: (a) requirement of long hours of aging process at high temperature due to the high melting point; and (b) poor compatibility with other rubbers.

In an aspect, the present invention discloses a process of preparing a 1,4-trans polybutadiene having a molecular weight of 50,000-2,000,000 grafted with an aromatic organosulfur compound, the process comprising:

(a) preparing a 1,4-trans polybutadiene by polymerizing 1,3-butadiene or butadiene derivatives in a nonpolar solvent in the presence of a catalyst comprising a two-phase catalyst or a three-phase catalyst, wherein the two-phase catalyst comprises 3-100 moles of a monomeric molecular organoaluminum compound relative to one mole of a cobalt compound, and the three-phase catalyst comprises 1-10 moles of a phenol-based compound and 10-100 moles of an oligomeric organoaluminum compound relative to one mole of a cobalt compound; and (b) preparing the 1,4-trans polybutadiene grafted with an aromatic organosulfur compound by reacting the 1,4-trans polybutadiene with an aromatic organosulfur compound:

[Formula 1]

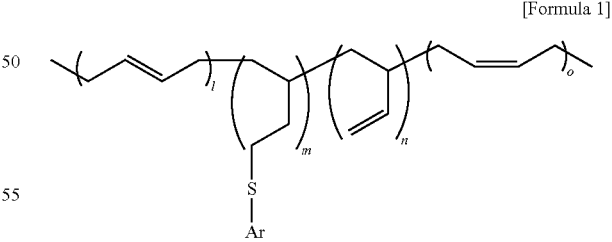

wherein l, m, n and o are repeating units of the main chain of the polybutadiene;
the contents of the

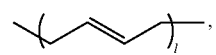

the

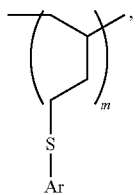

the

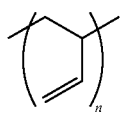

and the

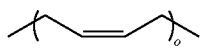

are 70-90 wt %, 0.05-5 wt %, 0-20 wt % and 0.1-10 wt %, respectively;

—S—Ar is an organosulfur group selected from the group consisting of halogen thiophenol, halogen thiopyridine, xylylmercaptan, tetrachlorobenzenedithiol, mercaptobenzothiazole, glycidyl pentachlorothiophenyl ether, glycidyl pentafluorothiophenyl ether, dibenzamidodiphenyldisulfide and zinc pentachlorothiophenol.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
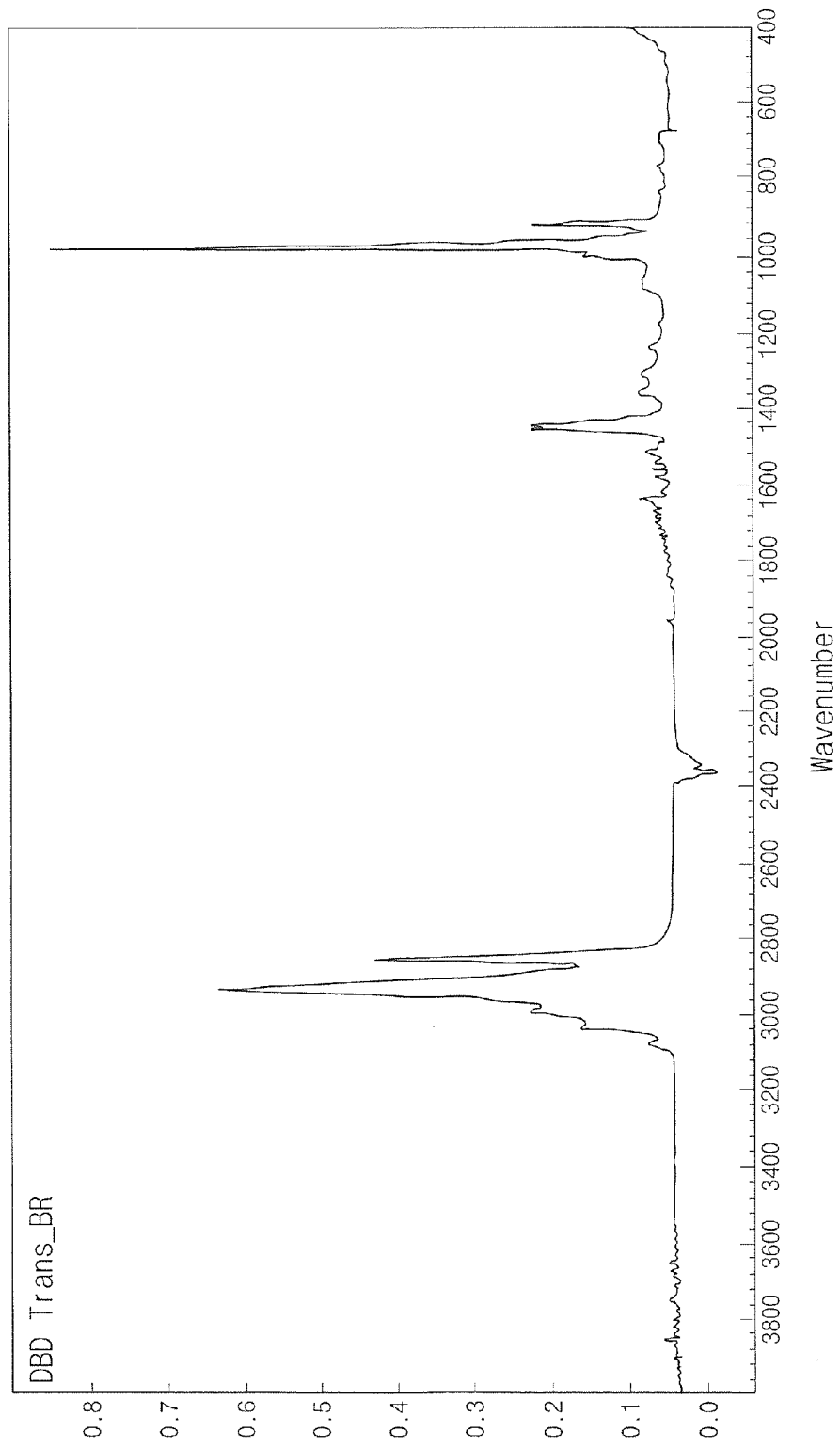
FIG. 1 shows IR spectroscopic spectrum (4,000-400 cm$^{-1}$, film casting) of a trans polybutadiene coupled with an aromatic organosulfur compound prepared in Example 1.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

In an aspect, the present invention discloses a 1,4-trans polybutadiene of Formula 1, which is grafted with an aromatic organosulfur compound:

[Formula 1]

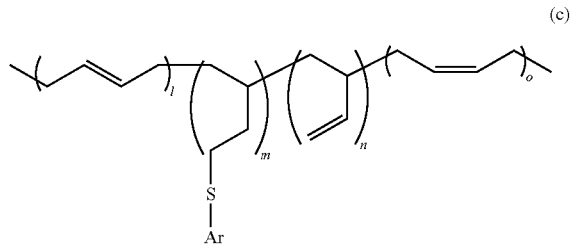

wherein l, m, n and o are repeating units of the main chain of the polybutadiene;

the contents of the

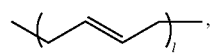

the

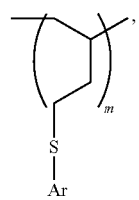

the

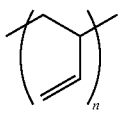

and the

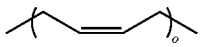

are 70-90 wt %, 0.05-5 wt %, 0-20 wt % and 0.1-10 wt %, respectively; —S—Ar is an organosulfur group selected from the group consisting of halogen thiophenol, halogen thiopyridine, xylylmercaptan, tetrachlorobenzenedithiol, mercaptobenzothiazole, glycidyl pentachlorothiophenyl ether, glycidyl pentafluorothiophenyl ether, dibenzamidodiphenyldisulfide and zinc pentachlorothiophenol.

In an embodiment, the present invention discloses a 1,4-trans polybutadiene with a molecular weight of 50,000-2,000,000.

The present invention is provided to maximize the function of the aromatic organosulfur compound, which is bound to the polymeric backbone of trans-polybutadiene. This can solve the conventional problems that a relatively high melting point of trans-polybutadiene and inferior compatibility with other rubbers require a long period of process time for aging and mixing processes.

A high 1,4-trans polybutadiene with aromatic organosulfur compounds bound to the polymer chain, which is prepared according to the present invention, decreases the region of ultra high polymer because organosulfur molecules exist in molecule chains, and narrows molecular weight distribution, thereby remarkably improving processability and properties.

Examples of the aromatic organosulfur compound include without limitation fluorothiophenol, chlorothiophenol, bromothiophenol, iodothiophenol, difluorothiophenol, dichlorothiophenol, dibromothiophenol, diiodothiophenol, trifluorothiophenol, trichlorothiophenol, tribromothiophenol, triiodothiophenol, tetrafluorothiophenol, tetrachlorothiophenol, tetrabromothiophenol, tetraiodothiophenol, pentafluorothiophenol, pentachlorothiophenol, pentabromothiophenol, pentaiodothiophenol, fluorothiopyridine, chlorothiopyridine, bromothiopyridine, iodothiopyridine, difluorothiopyridine, dichlorothiopyridine, dibromothiopyridine, diiodothiopyridine, trifluorothiopyridine, trichlorothiopyridine, tribromothiopyridine, triiodothiopyridine, tetrafluorothiopyridine, tetrachlorothiopyridine, tetrabromothiopyridine, tetraiodothiopyridine, xylylmercaptan, tetrachlorobenzenedithiol, mercaptobenzothiazole, tin dichlorooctaethylporphyrin, glycidyl pentachlorothiophenyl ether, glycidyl pentafluorothiophenyl ether, dibenzamidodiphenyldisulfide and zinc pentachlorothiophenol. These compounds comprise sulfur or thiol group, which is highly reactive with the vinyl group in polybutadiene, and stabilizes radicals due to its aromaticity.

A catalyst herein, used in a process of reacting 1,4-trans polybutadiene with aromatic organosulfur compound to provide a 1,4-trans polybutadiene grafted with an aromatic organosulfur compound, comprises a two-component catalyst comprising cobalt compound and monomeric organoaluminum compound or a three-component catalyst comprising cobalt compound, phenol compound and organoaluminum compound.

In another aspect, the present invention discloses a catalyst for preparing the aforementioned 1,4-trans polybutadiene grafted with an aromatic organosulfur compound. The catalyst comprises 3-100 moles of a monomeric organoaluminum compound relative to one mole of an organic acid or inorganic acid cobalt compound.

In still another aspect, the present invention discloses a catalyst for preparing the aforementioned 1,4-trans polybutadiene grafted with an aromatic organosulfur compound. The catalyst comprises 1-10 moles of a phenol-based compound and 10-100 moles of an oligomeric organoaluminum compound relative to one mole of an organic acid or inorganic acid cobalt compound In a nonpolar solvent, 1,3-butadiene or butadiene derivatives is polymerized in the presence of a two-component catalyst comprising (i) cobalt compound and (ii) monomeric organoaluminum compound (molar ratio=1:3-100) or three-component catalyst comprising (i) cobalt compound, (ii) phenol-based compound and (iii) oligomeric organoaluminum compound (molar ratio=1:1-10:10-100), thereby providing 1,4-trans polybutadiene. An oligomeric organoaluminum compound used in three-component system easily reduces the oxidized cobalt, thus lowering the activation while, in a two-component catalyst system, monomeric aluminum stably maintains the oxidized state of cobalt. A 1,4-trans polybutadiene prepared as mentioned above has a trans content of 70% or higher.

Cobalt salt of organic acid or inorganic acid can be used as the cobalt compound. Among them, organic acid salt having superior solubility to organic solvent is preferred, and carboxylic acid salt is more preferred. The carboxylic acid has $C_8$-$C_{20}$ saturated or unsaturated, cyclic or linear structure, and its examples include without limitation octoate, naphthenate, versatate and stearate. Examples of the cobalt carboxylic acid salt include without limitation cobalt versatate, cobalt octoate and cobalt naphthenate.

The monomeric organoaluminum compound is a trivalent monomeric aluminum compound of Formula 2 or a pentavalent monomeric aluminum compound of Formula 3:

The heteroatom-coordinated monomeric aluminum compound has a valence number of 3-6, and alkyl or halogen group can be used. As the monomeric aluminum compound, a trivalent monomeric aluminum or a pentavalent monomeric aluminum is preferred. The trivalent monomeric aluminum is easy to prepare and has a planar structure, and the pentavalent monomeric aluminum has a relatively large steric structure and is stable due to a cyclic structure. The composition of coordinating ligand in the pentavalent monomeric aluminum can also be easily changed.

[Formula 2]

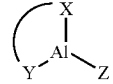

[Formula 3]

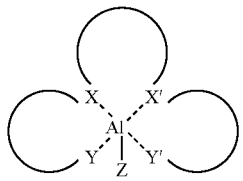

wherein each of X, X', Y and Y' is selected from the group consisting of an oxygen atom, a nitrogen atom, a phosphorus atom, a sulfur atom, alkoxy, phenoxy, carboxyl, alkylsiloxy, allylsiloxy, an alkoxy substituted with halogen and a phenoxy substituted with halogen; and Z is selected from the group consisting of a hydrogen atom, a $C_1$-$C_{10}$ alkyl, a $C_1$-$C_{10}$ aryl and a halogen.

Examples of the trivalent monomeric aluminum include without limitation p-ethylphenoxy dibutylaluminum, p-ethylphenoxy diethylaluminum, p-octylphenoxy dibutylaluminum, p-octylphenoxy diethylaluminum, o-octylphenoxy dibutylaluminum, o-octylphenoxy diethylaluminum, p-decylphenoxy diethylaluminum, p-decylphenoxy dibutylaluminum, p-dodecylphenoxydi ethylaluminum, p-dodecylphenoxydi butylaluminum, di(2-ethylhexaneoxy) ethylaluminum, di(2,4,6-tri-t-butylphenoxy)ethylaluminum, 3,5-diisopropylcatechoxy ethylaluminum, dipentafluorophenoxy ethylaluminum, dipentachlorophenoxyethylaluminum, 2,2'-ethylidene-bis(4,6-dibutylphenoxy)ethylaluminum, dipentabromophenoxyethyl aluminum, dipentaiodophenoxy ethylaluminum, pentafluorophenoxypentachlorophenoxy ethylaluminum, pentabromophenoxypentachlorophenoxy ethylaluminum and pentafluorophenoxypentabromophenoxy ethylaluminum.

The pentavalent monomeric aluminum has a semicircular structure, and its examples include without limitation diaminocyclohexane-biphenol-salen ethylaluminum, diaminocyclohexane-binaphthol-salen ethylaluminum, ethylalumino1, 3-cyclohexanediimine-N,N'-bis(3,5-di-t-butylsalicylidene) aluminum, ethylaluminotetraphenylporphyrin, ethylaluminophthalocyanine, ethylaluminonaphthalocyanine and a mixture thereof.

The monomeric organoaluminum compound is used in an amount of 3-100 moles relative to one mole of cobalt compound. When the amount is outside the range, reactivity can be deteriorated.

In a three-component catalyst system, examples of the phenol-based compound include without limitation phenol, ethylphenol, butylphenol, octylphenol, nonylphenol, dodecylphenol, hexyloxy phenol, diethylphenol, dibutylphenol, dioctylphenol, didodecylphenol, tri-t-butylphenol, tri-octylphenol, tri-dodecylphenol, pentaethylphenol, pentabutylphenol, pentaoctylphenol, pentachlorophenol and pentabromophenol.

In a three-component catalyst system, the oligomeric organoaluminum compound is a compound of Formula 4, and its examples include, without limitation, trimethylaluminum, triethylaluminum, tripropylaluminum, tributylaluminum, triisobutylaluminum, trihexylaluminum and diisobutylaluminum hydride.

$AlR^3_3$ [Formula 4]

wherein $R^3$ is selected from the group consisting of a hydrogen atom, a $C_1$-$C_{10}$ alkyl and a $C_1$-$C_{10}$ aryl group.

The oligomeric organoaluminum compound is used in the amount of 10-100 moles relative to one mole of cobalt compound. When the amount is outside the range, reactivity can be decreased.

Any solvent that is used in the field the present invention pertains to can be used for preparing the catalyst system herein. Any solvent without reactivity with a catalyst herein, for example, nonpolar solvent such as cyclohexane, hexane, heptane or toluene and xylene can be used.

Further, a reactant, butadiene or butadiene derivatives, can be added during the aging of the catalyst, which can maintain the activation of catalyst and prevent the precipitation while affecting the physical properties of rubber. The reactant is preferred to be added in the amount of 1-10 moles relative to one mole of cobalt compound.

For preparing aged catalyst, cobalt compound catalyst solution comprising butadiene or butadiene derivatives is added in a catalyst reactor under nitrogen atmosphere, followed by the addition of compounds comprising halogen and organoaluminum compound. The order of addition can be changed depending on the process, and these compounds can be introduced immediately without the aging step. Considering the influence on the properties of products, aging time and aging temperature are preferred to be controlled in the range of between 5 minutes and 2 hours and between −30° C. and 60° C., respectively.

The catalyst is used in the amount of $1 \times 10^{-3}$-$1 \times 10^{-5}$ mole relative to 100 g of monomer. When the amount is less than $1 \times 10^{-5}$ mole, reaction may be too slow, while reaction can abruptly proceed when the amount is more than $1 \times 10^{-3}$ mole thereby causing difficulties in controlling temperature and molecular weight of polymer.

In an embodiment, the catalyst is used in the amount of $1 \times 10^{-3}$-$1 \times 10^{-5}$ weight parts relative to 100 weight parts of the 1,3-butadiene or butadiene derivatives.

1,3-Butadiene, isoprene, 1,3-pentadiene, 2,3-dimethyl-1,3-butadiene or myrcene can be used as the reactant, 1,3-butadiene or butadiene derivatives.

Nonpolar solvents such as aliphatic hydrocarbon, cycloaliphatic hydrocarbon, benzene, ethylbenzene and xylene can be used as the polymerization solvent. Examples of the polymerization solvent include without limitation butane, pentane, hexane, isopentane, heptane, octane, isooctane, cyclopentane, methylcyclopentane, cyclohexane, methylcyclohexane, ethylcyclohexane, benzene, toluene, ethylbenzene and xylene. The polymerization solvent is preferred to be used in the state free of oxygen and water.

The nonpolar solvent is used in the amount of 3-10 times more than the monomer. When the amount is less than 3 times, it is difficult to transport polymerization solution. When the amount is more than 10 times, reactivity can be decreased.

In an embodiment, the nonpolar solvent is used in the amount of 3-10 weight ratio relative to the total weight of the reactants in the step (a).

Polymerization begins under a highly-pure nitrogen atmosphere at a temperature of between −20° C. and 100° C. Appropriate polymerization time is from 30 minutes to 3 hours. Yield of higher than 70% can be achieved.

A high 1,4-trans polybutadiene (trans content of higher than 70% and the molecular weight of 50,000-2,000,000) is prepared as described above.

An then, trans polybutadiene is reacted with aromatic organosulfur compound (weight ratio=1:0.05-2, to give a 1,4-trans polybutadiene comprising aromatic organosulfur compound chemically bound to the end of 1,4-trans polybutadiene.

Examples of the aromatic organosulfur compound include without limitation fluorothiophenol, chlorothiophenol, bromothiophenol, iodothiophenol, difluorothiophenol, dichlorothiophenol, dibromothiophenol, diiodothiophenol, trifluorothiophenol, trichlorothiophenol, tribromothiophenol, triiodothiophenol, tetrafluorothiophenol, tetrachlorothiophenol, tetrabromothiophenol, tetraiodothiophenol, pentafluorothiophenol, pentachlorothiophenol, pentabromothiophenol, pentaiodothiophenol, fluorothiopyridine, chlorothiolpyridine, bromothiolpyridine, iodothiopyridine, difluorothiopyridine, dichlorothiopyridine, dibromothiopyridine, diiodothiopyridine, trifluorothiopyridine, trichlorothiopyridine, tribromothiopyridine, triiodothiopyridine, tetrafluorothiopyridine, tetrachlorothiopyridine, tetrabromothiopyridine, tetraiodothiopyridine, xylylmercaptan, tetrachlorobenzenedithiol, mercaptobenzothiazole, glycidyl pentachlorothiophenyl ether, glycidyl pentafluorothiophenyl ether, dibenzamidodiphenyldisulfide and zinc pentachlorothiophenol.

And then, 2,6-di-t-butyl-para-cresol is added as an anti-oxidant, and methyl alcohol or ethyl alcohol is added to terminate the reaction.

As a result, a 1,4-trans polybutadiene comprising aromatic organosulfur compound bound to the 1,4-trans polybutadiene is prepared, and this can be ascertained by using a gel permeation chromatography.

EXAMPLES

The following examples illustrate the invention and are not intended to limit the same.

Example 1

Organosulfur-Grafted Polybutadiene Prepared by Using a Cobalt Octoate/Monomeric Aluminum Catalyst with the Addition of Dibenzamidodiphenyl Disulfide (0.6 g)

Figure 2:
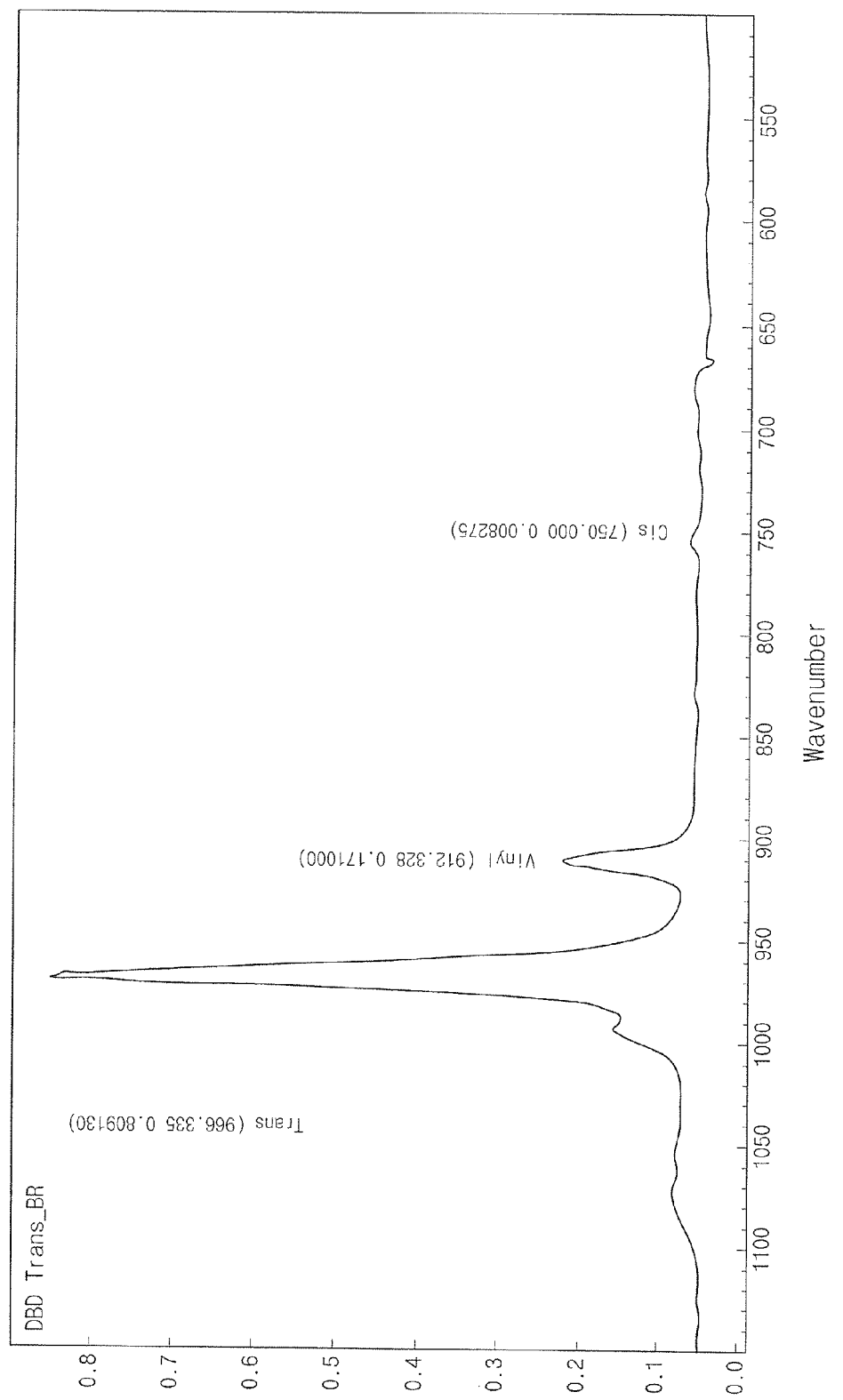
FIG. 2 shows IR spectroscopic spectrum ($CS_2$ solution) of a trans polybutadiene coupled with an aromatic organosulfur compound prepared in Example 1.
Figure 3:
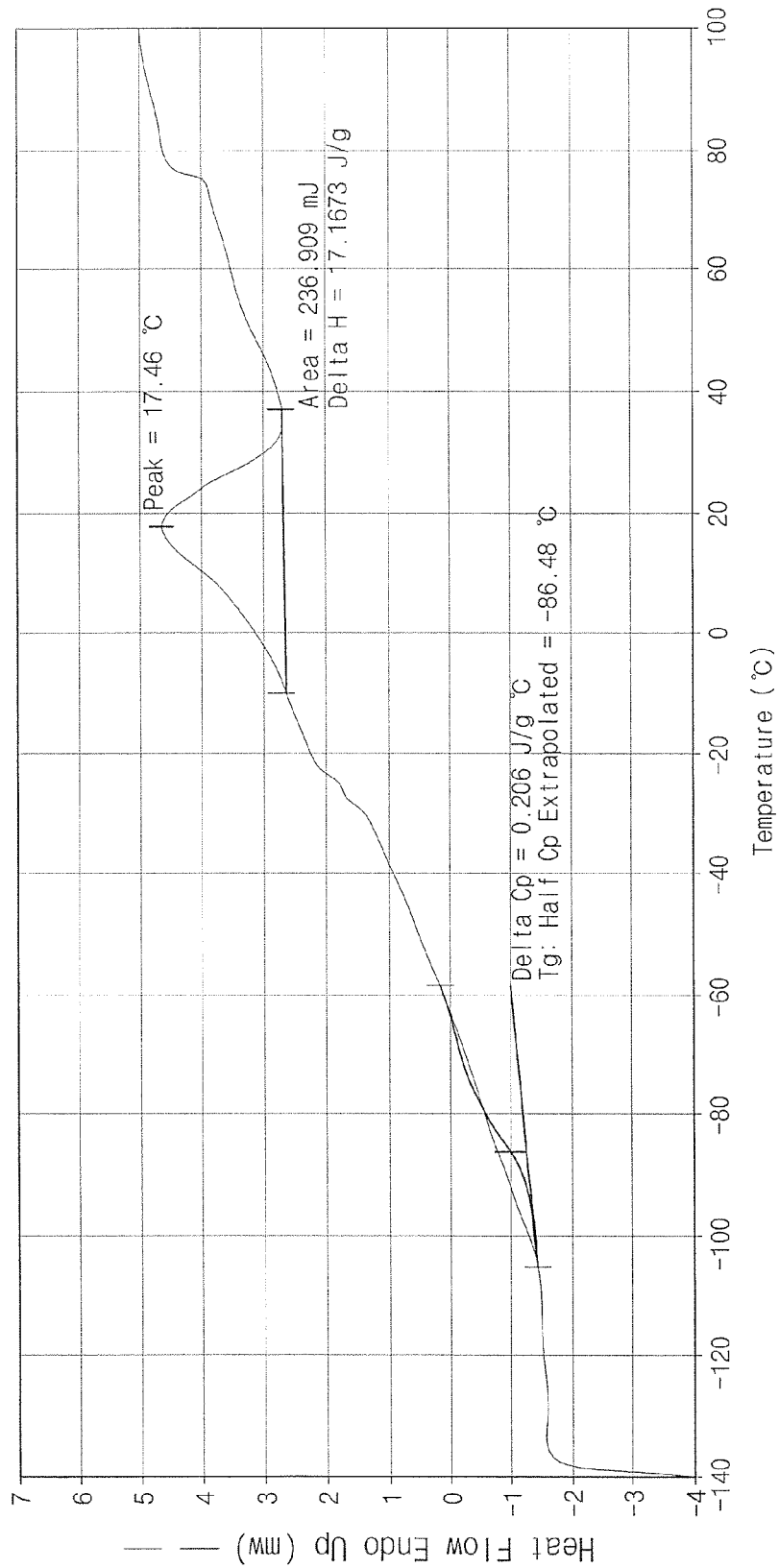
FIG. 3 shows the DSC results (10° C./min, Tm=17.5° C., Tg=−86.5° C.) of 1,4-trans polybutadiene prepared in Example 1.

The Ziegler-Natta catalyst used in the reaction comprises cobalt octoate (1.0% cyclohexane solution) and a monomeric ethylsalen aluminum (EtAl-Salen). This cobalt catalyst was used in the amount of $7.0 \times 10^{-5}$ mole relative to 100 g of monomer. After sufficiently purging nitrogen in a 10 L pressurized reactor, cobalt octoate and monomeric aluminum were rapidly added (molar ratio=1:20) in cyclohexane solvent (3.0 kg), and monomer (butadiene, 600 g) was added, followed by the polymerization at 60° C. for 2 hours. Dibenzamidodiphenyl disulfide (0.6 g) dissolved in tetrahydrofuran (10 mL) was added in the polymerization solution, and this solution was stirred at 80° C. for an hour. 2,6-Di-t-butyl-para-cresol (5.0 g, 33% toluene solution) was added as an anti-oxidant, and ethanol (50 mL) and polyoxyethylene phosphate (3.0 g, 20% toluene solution) were added to terminate the reaction. The results of mass analysis conducted by using a gel permeation chromatography were presented in Table 1. IR spectroscopic spectra are provided in FIGS. 1 and 2. The results of thermal analysis is shown in FIG. 3 (Tm=17.5° C., Tg=−86.5° C.).

Example 2

Organosulfur-Grafted Polybutadiene Prepared by Using a Cobalt Octoate/Monomeric Aluminum Catalyst with the Addition of Dibenzamidodiphenyl Disulfide (1.5 g)

Polymerization was conducted the same as in Example 1 except that a functionalized trans polybutadiene and a trans polybutadiene were used as an aromatic organosulfur compound for the purpose of comparison. After sufficiently purging nitrogen in a 10 L pressurized reactor, cobalt octoate and monomeric aluminum were rapidly added (molar ratio=1:20) in cyclohexane solvent (3.0 kg), and monomer (butadiene, 600 g) was added, followed by the polymerization at 60° C. for 2 hours.

A predetermined amount of polymer solution (1,800 g) was separated, and added with 2,6-di-t-butyl-para-cresol (an anti-oxidant, 5.0 g, 33% toluene solution) together with polyoxyethylene phosphate (3.0 g, 20% toluene solution) and ethanol (50 mL) to terminate the polymerization. Dibenzamidodiphenyl disulfide (1.5 g) dissolved in tetrahydrofuran (10 mL) was added in the remaining polymerization solution, and polymerization was conducted for an hour at 80° C. A particular amount of this polymer solution (30 g) was used for the analysis, and the results are provided in Table 1.

Figure 4:
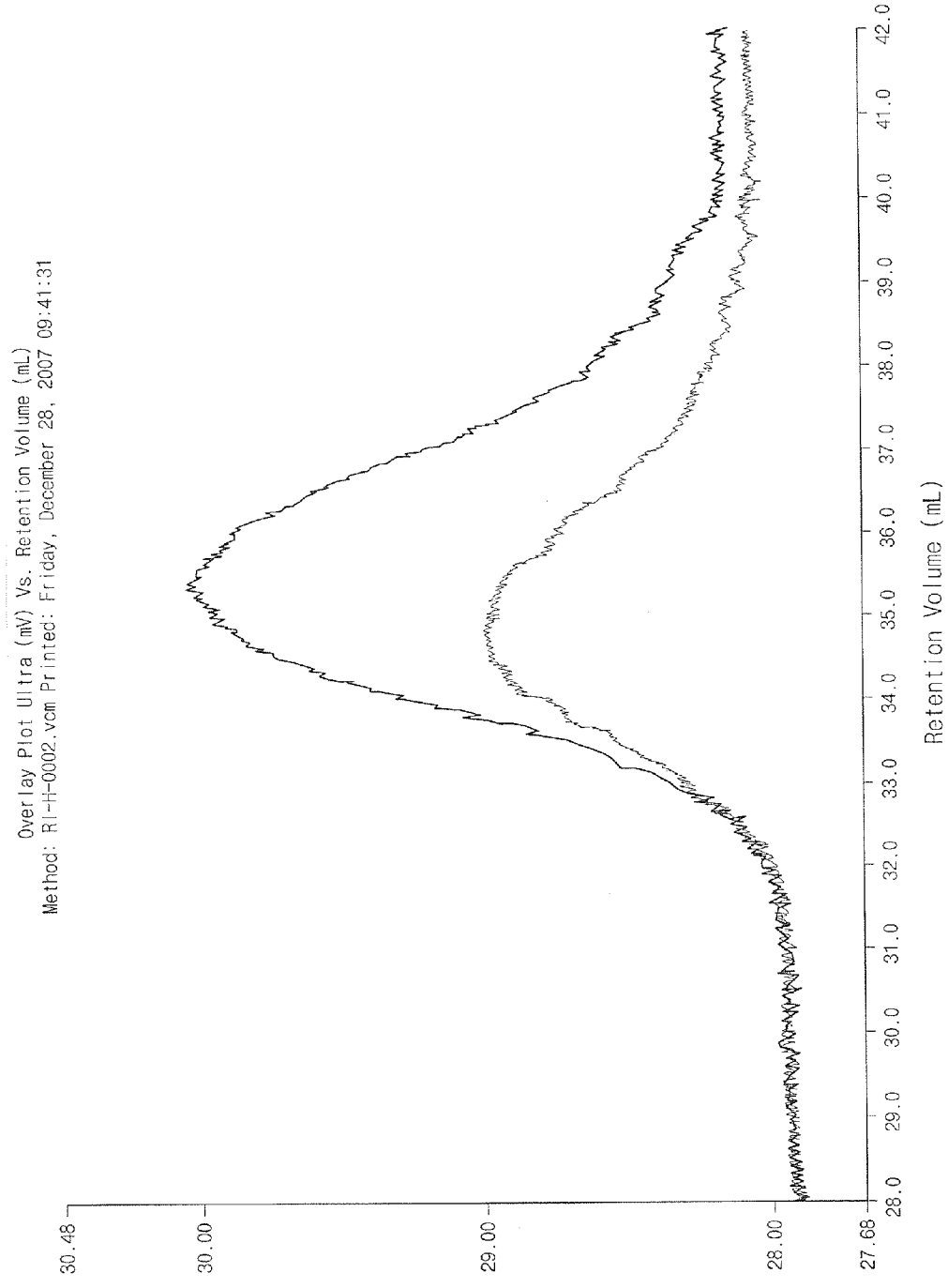
FIG. 4 show the gel chromatography of 1,4-trans polybutadiene prepared in Example 2 measured with a UV absorbance detector. Dark blue and green represents trans-BR and DBD(0.5 PHR)-transBR, respectively.

FIG. 4 shows the gel chromatography measured with a UV absorbance detector. UV absorbance is proportional to the sensitivity of the material. Dark blue represents trans-polybutadiene (Mw: 383,000, molecular weight distribution: 2.87) prepared in the first butadiene polymerization. Green represents polybutadiene grafted with aromatic compound (DBD-transBR, Mw: 294,000 molecular weight distribution: 2.04) prepared in the aforementioned second polymerization. Lower peaks were detected for polybutadiene showing a relatively lower UV absorbance, while higher peaks were detected for polybutadiene comprising aromatic organosulfur showing a relatively higher UV absorbance. Green (DBD-transBR) represents a high trans polybutadiene comprising aromatic compounds, which was prepared in the second step. It was ascertained that the aromatic sulfur compounds are bound to the polymeric chain of polybutadiene from polymer region to molecule region. Ultra high polymer region decreased, and the molecular weight distribution also remarkably decreased.

Example 3

Organosulfur-Grafted Polybutadiene Prepared by Using a Cobalt Octoate/Monomeric Aluminum Catalyst with the Addition of Dibenzamidodiphenyl Disulfide (1.5 g) and Pentachlorothiophenol (1.5 g)

Pentachlorothiophenol (1.5 g) dissolved in tetrahydrofuran (10 mL) was additionally added in the reaction resolution of Example 2, and the analysis results are provided in Table 1.

Figure 5:
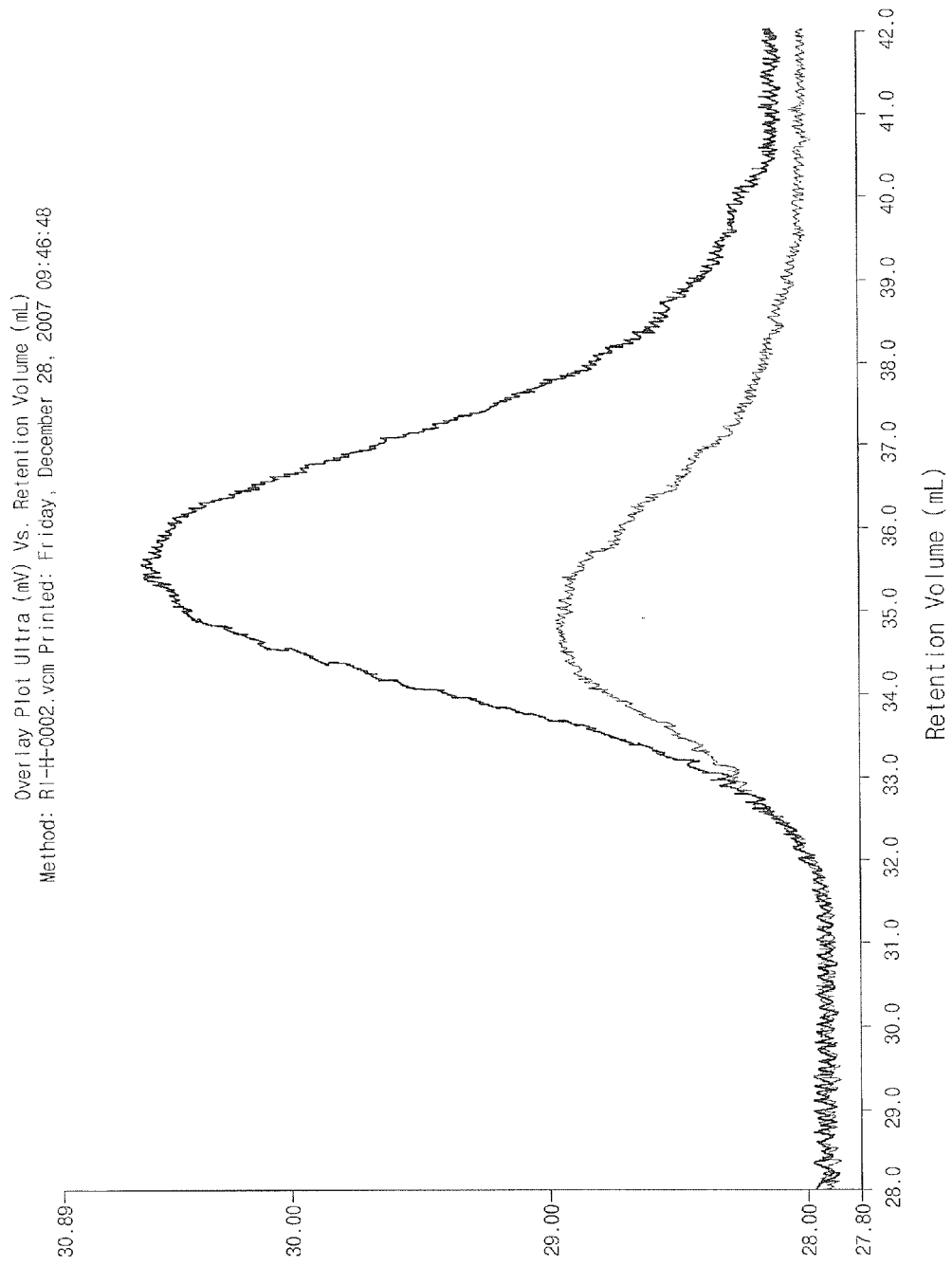
FIG. 5 shows the gel chromatography of a 1,4-trans polybutadiene prepared in Example 3 measured with a UV absorbance detector. Dark blue and red represent trans-BR and DBD(1.0 PHR)-transBR, respectively.

FIG. 5 shows gel chromatography obtained by UV absorbance. Material with a relatively higher UV absorbance is more sensitive. Dark blue represents trans-polybutadiene (Mw: 383,000, molecular weight distribution: 2.87) prepared in the butadiene polymerization of the first step. Red represents polybutadiene (DBD-transBR, Mw: 229,000 molecular weight distribution: 1.95) with aromatic compound bound to the polymeric chain prepared in the second step. It was ascertained that ultra high molecular weight regions decreases and molecular weight distribution thus remarkably decreases. Lower peaks were detected for polybutadiene showing a relatively lower UV absorbance, while higher peaks were detected for polybutadiene comprising aromatic organosulfur showing a relatively higher UV absorbance. Red represents a high trans polybutadiene comprising aromatic compounds, which was prepared in the second step. It was ascertained that the aromatic sulfur compounds are bound to the polymeric chain of polybutadiene.

Figure 6:
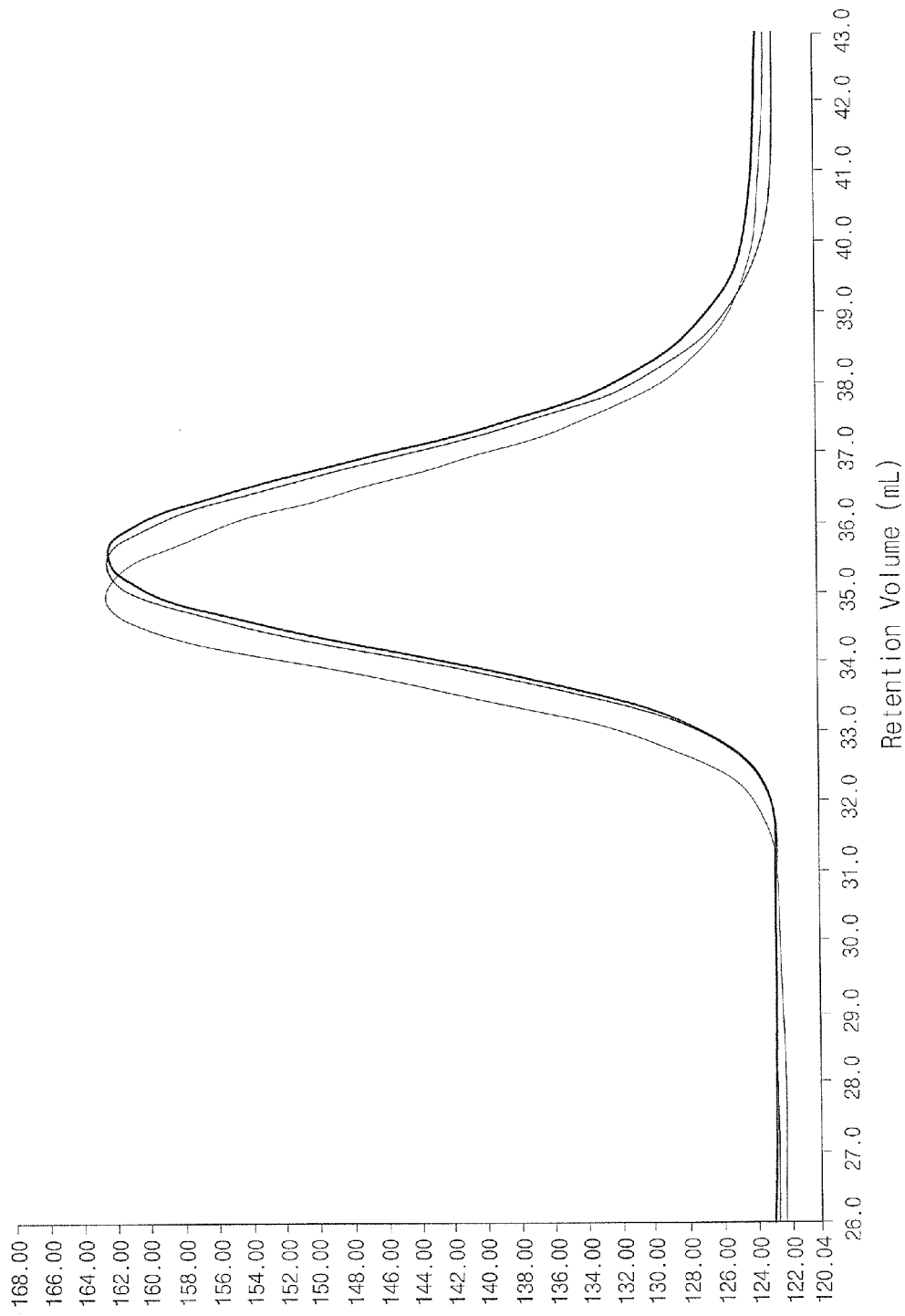
FIG. 6 shows the gel chromatography of a 1,4-trans polybutadiene prepared in Example 3 measured with a refractive index (RI) detector. Dark blue, green and red represent trans-BR, DBD(0.5 PHR)-transBR and DBD(1.0 PHR)-transBR, respectively.
Figure 7:
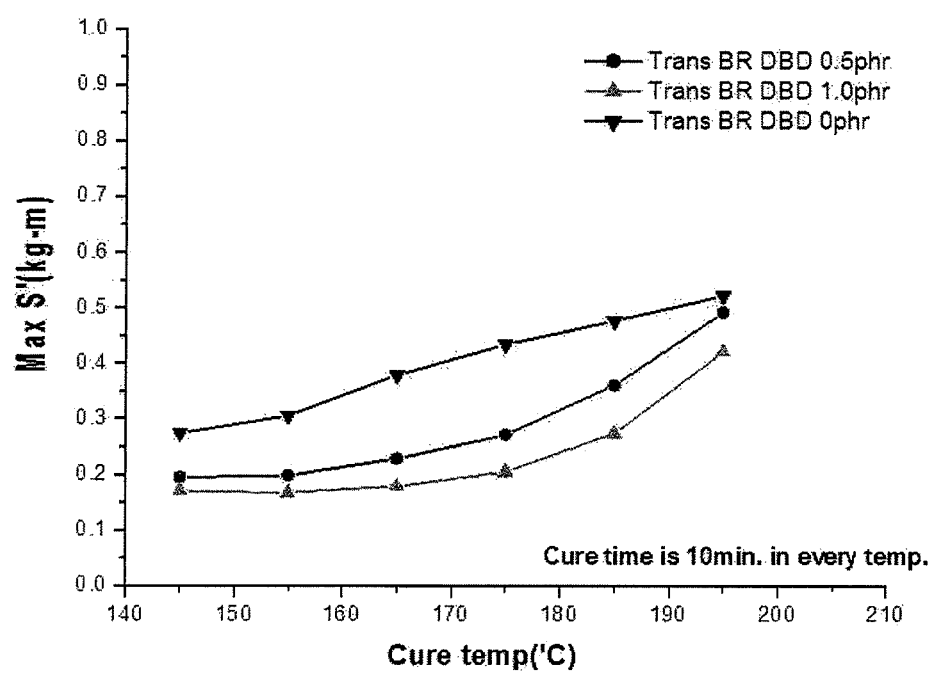
FIG. 7 shows temperature-dependent processability (torque) observed by using a rubber processing analyzer (RPA) in Comparative Example 1.

FIG. 6 shows gel chromatography of 1,4-trans polybutadiene obtained by using a refractive index (RI) detector. Black, green and red represent trans-BR, DBD (0.5 PHR)-transBR and DBD (1.0 PHR)-transBR, respectively. FIG. 7 shows temperature-dependent processability (torque) measured by using a rubber processing analyzer (RPA). It was ascertained that processability is improved as the DBD content increases.

Example 4

Organosulfur-Grafted Polybutadiene Prepared by Using a Cobalt Octoate/Monomeric Aluminum (i.e., Triethylaluminum/P-Dodecylphenol Catalyst with the Addition of Pentachlorothiophenol (1.5 g)

The Ziegler-Natta catalyst used in the reaction comprises cobalt octoate (1.0% cyclohexane solution), triethylaluminum (1.0 M toluene solution) and p-dodecylphenol (1.0 M toluene solution). The component ratio (Co/Al/phenol) was Jan. 20, 1950. After sufficiently purging nitrogen in a 5 L pressurized reactor, cobalt octoate, triethylaluminum and p-dodecylphenol were subsequently and rapidly added in cyclohexane solvent (1.5 kg), followed by the polymerization at 60° C. for 2 hours.

Pentachlorothiophenol (1.5 g) dissolved in tetrahydrofuran (10 mL) was added in the polymerization solution, and this solution was stirred at 80° C. for an hour. 2,6-Di-t-butyl-para-cresol (5.0 g, 33% toluene solution) was added as an anti-oxidant, and ethanol (50 mL) and polyoxyethylene phosphate (3.0 g, 20% toluene solution) were added to terminate the reaction. The results of mass analysis conducted by using a gel permeation chromatography were presented in Table 1.

Example 5

Organosulfur-Grafted Polybutadiene Prepared by Using a Cobalt Octoate/Monomeric Aluminum (i.e., Triethylaluminum/P-Dodecylphenol Catalyst) with the Addition of Pentachlorothiophenol (3.0 g)

The first polymerization was conducted the same as in Example 4 except that pentachlorothiophenol (3.0 g) dissolved in tetrahydrofuran (20 mL) was used instead of pentachlorothiophenol (1.5 g) dissolved in tetrahydrofuran (10 mL) in combination with dicumyl peroxide (0.15 g) as a radical initiator. The results are presented in Table 1.

Example 6

Organosulfur-Grafted Polybutadiene Prepared by Using a Cobalt Octoate/Oligomeric Aluminum (i.e., Triethylaluminum/P-Dodecylphenol Catalyst) with the Addition of Tetrachlorothiopyridine (1.5 g)

The first polymerization was conducted the same as in Example 4 except that tetrachlorothiopyridine (1.5 g) dissolved in tetrahydrofuran (20 mL) was used instead of pentachlorothiophenol (1.5 g) dissolved in tetrahydrofuran (10 mL). The results are presented in Table 1.

Example 7

Organosulfur-Grafted Polybutadiene Prepared by Using a Cobalt Octoate/Oligomeric Aluminum (i.e., Triethylaluminum/P-Dodecylphenol Catalyst) with the Addition of Tetrachlorothiopyridine (3.0 g)

Polymerization was conducted the same as in Example 4 except that tetrachlorothiopyridine (3.0 g) dissolved in tetrahydrofuran (20 mL) was used instead of pentachlorothiophenol (1.5 g) dissolved in tetrahydrofuran (10 mL). The results are presented in Table 1.

Comparative Example 1

Trans Polybutadiene without being Grafted with Organosulfur Compound Prepared by Using a Cobalt Octoate/Monomeric Aluminum Catalyst After the polymerization of Example 2, a predetermined amount of the polymer solution (1,800 g) was separated, and added with 2,6-di-t-butyl-para-cresol (5.0 g, 33% toluene solution), as an anti-oxidant, followed by the addition of polyoxyethylene phosphate (3.0 g, 20% toluene solution) and ethanol (50 mL) to terminate the reaction. Mass analysis was conducted by using a gel permeation chromatography (Mw: 383,000, MWD: 2.87).

Figure 8:
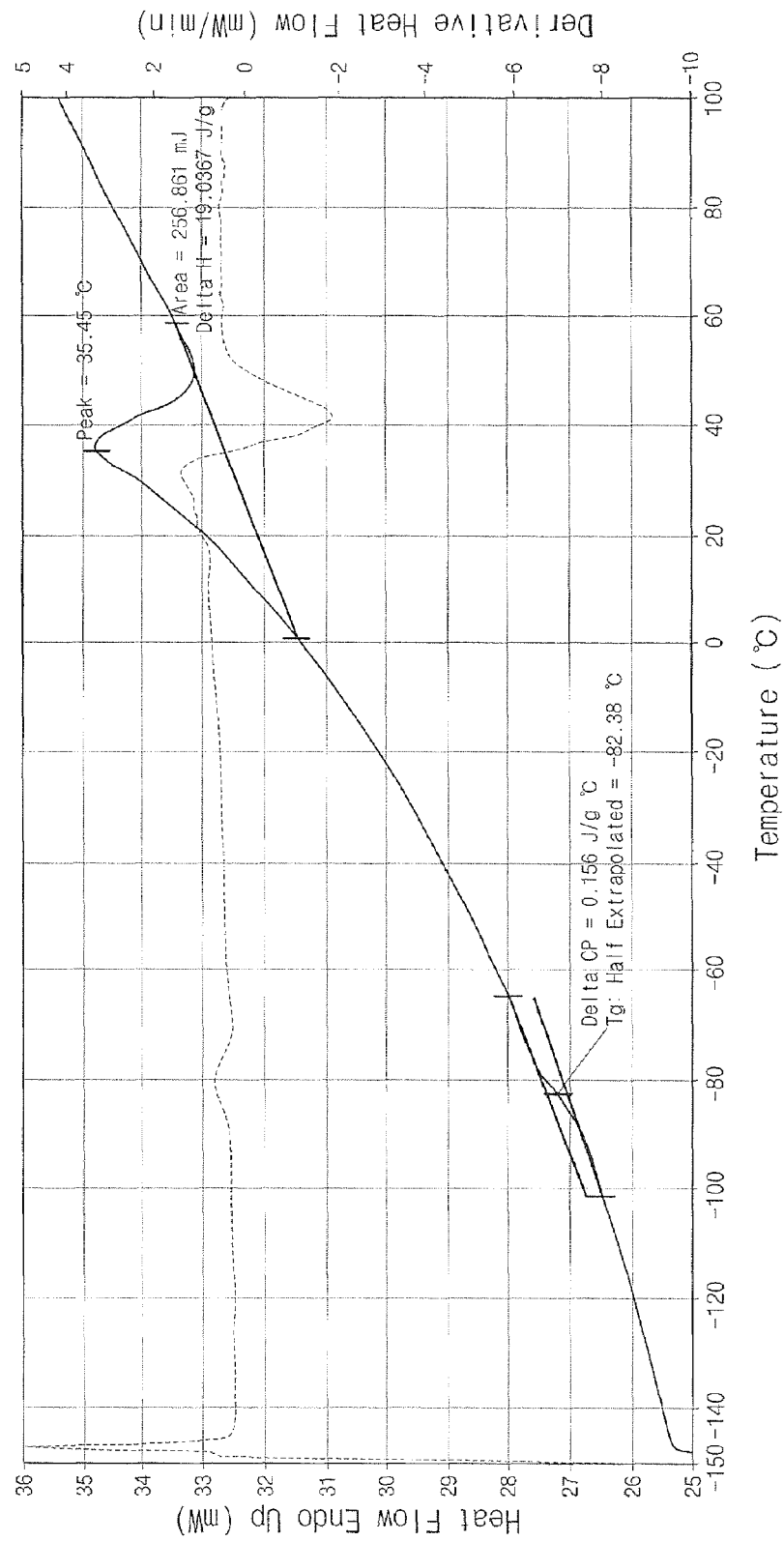
FIG. 8 shows thermal analysis of 1,4-trans polybutadiene observed in Comparative Example 1.

The results of the gel permeation chromatography were shown in Table 1 and FIG. 4. FIGS. 7 and 8 are the results of RPA and DSC (Tm=35.5° C., Tg=−82.4° C.), respectively. It was ascertained that processability is improved as the DBD content increases.

Comparative Example 2

Trans Polybutadiene without being Grafted with Organosulfur Compound Prepared by Using a Cobalt Octoate/Triethylaluminum/P-Dodecylphenol Catalyst The same catalyst as in Example 4 was used. Ziegler-Natta catalyst comprises cobalt octoate (1.0% cyclohexane solution), triethylaluminum (1.0 M toluene solution) and p-dodecylphenol (1.0 M toluene solution). This cobalt catalyst was used in the amount of $7.0 \times 10^{-5}$ mole relative to 100 g of monomer, and the component ratio in this catalyst (Co/Al/phenol) was Jan. 20, 1950. After sufficiently purging nitrogen in a 5 L pressurized reactor, cobalt octoate, triethylaluminum and p-dodecylphenol were subsequently and rapidly added in cyclohexane solvent (1.5 kg). This solution was also added with monomer (butadiene, 300 g), and polymerized at 60° C. for 2 hours.

Figure 9:
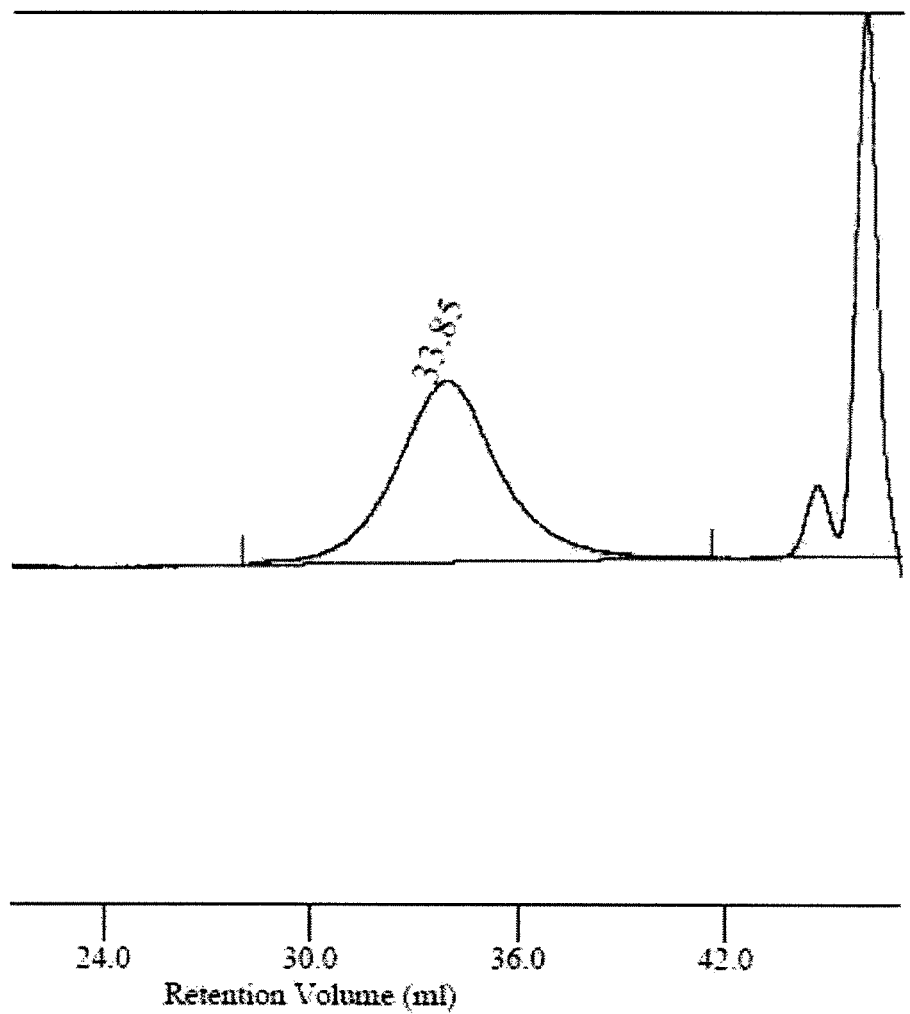
FIG. 9 shows the mass analysis by using a gel permeation chromatography in Comparative Example 2.

2,6-Di-t-butyl-para-cresol (5.0 g, 33% toluene solution) was added as an anti-oxidant, and ethanol (50 mL) and polyoxyethylene phosphate (3.0 g, 20% toluene solution) were added to terminate the reaction. The results of mass analysis conducted by using a gel permeation chromatography were presented in Table 1 and FIG. 9.

Test Example 1

Measurement of Mooney Viscosity

Two specimens (5 cm×5 cm, thickness 0.8 cm) were prepared with a roller by using 30 g of solid rubber of polybutadiene, each of which was prepared in Examples 1-7 and Comparative Examples 1 and 2. Specimens were attached to the front and the back sides of a rotor, and viscosity was measured with a rotator viscometer (ALPHA Technologies, MOONEY MV2000). The rotor with specimen was loaded on the rotator viscometer, and pre-heated at a speed of 100° C./min. The change in viscosity was observed for 4 minutes, and then Mooney viscosity ($ML_{1+4}$, 100° C.) was obtained. The results are provided in Table 1.

Test Example 2

Measurement of Content of Microstructure

For the characterization of the micro-state of solid rubber, the cis content was measured by using the Morero method. Solid rubber (40 mg) was completely dissolved in 5 mL of $CS_2$, and the solution was placed in liquid KBr cells, which are 1 mm distant from each other, for the measurement using IR spectroscopic device (FTS-60A, BIO-RAD).

Target IR peaks were cis absorbance (AC, 739 $cm^{-1}$), vinyl absorbance (AV, 912 $cm^{-1}$) and trans absorbance (AT, 966 $cm^{-1}$). Cis content was calculated from the absorbance measured by using the following formulas.

$$C=(1.7455AC-0.0151AV) \quad (1)$$

$$V=(0.3746AV-0.0070AC) \quad (2)$$

$$T=(0.4292AT-0.0129AV-0.0454AC) \quad (3)$$

$$cis(\%)=C/(C+V+T)\times100 \quad (4)$$

$$trans(\%)=T/(C+V+T)\times100 \quad (5)$$

$$vinyl(\%)=V/(C+V+T)\times100 \quad (6)$$

TABLE 1

| Ex. | Aromatic Organo-sulfur | Aromatic Organo-sulfur (phr)[1] | Mooney viscosity $(ML_{1+4}, 100)$ | Mw[2] | MWD[3] | Trans content | Vinyl content | Cis content |
|---|---|---|---|---|---|---|---|---|
| Ex. 1 | DBD | 0.2 | 59.0 | 352,500 | 2.20 | 83.5% | 15.0% | 1.5% |
| Ex. 2 | DBD | 0.5 | 49.5 | 294,000 | 2.04 | 83.1% | 15.5% | 1.4% |
| Ex. 3 | DBD | 1.0 | 41.0 | 229,000 | 1.95 | 83.1% | 15.4% | 1.5% |
| Ex. 4 | PCTP | 0.5 | 62.5 | 409,800 | 2.29 | 83.0% | 15.7% | 1.3% |
| Ex. 5 | PCTP | 1.0 | 47.5 | 257,900 | 2.15 | 83.7% | 14.8% | 1.5% |
| Ex. 6 | TCTP | 0.5 | 45.5 | 238,700 | 2.25 | 84.1% | 14.5% | 1.4% |
| Ex. 7 | TCTP | 1.0 | 50.5 | 304,700 | 2.15 | 83.4% | 15.0% | 1.6% |
| Comp. Ex. 1 | — | — | 65.0 | 383,000 | 2.87 | 83.0% | 15.5% | 1.5% |
| Comp. Ex. 2 | — | — | 74.5 | 497,000 | 2.96 | 82.9% | 15.9% | 1.2% |

DBD: Dibenzamidodiphenyl disulfide
PCTP: Pentachlorothio phenol
TCTP: Tetrachlorothiopyridine
[1] Weight to 100 weight parts of polybutadiene
[2] Mw: Weight average molecular weight
[3] MWD: Molecular weight distribution As shown in Table 1, the products prepared in Examples 1-7 have the trans content of 70-90 wt %, vinyl content of 0-20 wt %, the cis content of 0.1-10 wt % and a melting point of 10-30° C.

The trans polybutadiene of the present invention comprises 0.05-5 wt % of

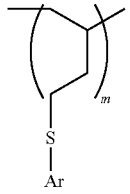

with organosulfur compound bound to the polymeric chain. As shown in Table 1, the amount of the aromatic organosulfur compound is preferred to be in the range of 0.05-5 wt %.

Although Comparative Examples 1 and 2 also fall in the aforementioned range, they do not comprise an organosulfur compound. When the amount of the organosulfur compound is less than 0.05 wt %, it is difficult to lower Mooney viscosity or molecular weight as in Comparative Examples 1 and 2. When the amount of the organosulfur compound is more than 5 wt %, compound Mooney viscosity measured in Test Example 3 is too low.

Test Example 3

Evaluation of Properties 3 weight parts of zinc oxide (ZnO), 2 weight parts of stearic acid, 43 weight parts of carbon black (N 330), 17 weight parts of silica (Zeosil 175), 1.7 weight parts of a coupling agent, 9 weight parts of a process oil and 3.5 weight parts of an anti-oxidant were sequentially introduced into a sealed mixer (Banbury mixer) relative to 100 weight parts of trans polybutadiene prepared in Example 4 and Comparative Example 2, natural rubber and S-SBR. The mixture was mixed at 120° C. and 60 rpm for 6 minutes and 30 seconds in the first mixing step. The process temperature was lowered to 60° C. Sulfur (1.3 weight parts), a vulcanization accelerator (0.9 weight parts) and the mixture of the first mixing step were placed in the mixer, and mixed at 60° C. and 50 rpm for 3 minutes. The mixture was processed into flat sheet in a 2 mm thick roller, and placed untreated for 24 hours. The sheet was vulcanized in a hot press (160° C., 160 kgf/$cm^2$ or higher) for 10 minutes to provide 2 mm thick sheets for the measurement of properties. The measured properties are provided in Table 2.

TABLE 2

| | TEST GRADE | Comp. Ex. 2 | Ex. 7 |
|---|---|---|---|
| Blend ratio | SSBR/NR/Trans-BR | 50/20/30 | 50/20/30 |
| Cure properties (160° C.) | Comp MV (100° C.) | 88.0 | 70.0 |
| | ML (dNm) | 4.5 | 3.9 |
| | MH (dNm) | 24.5 | 23.0 |
| | T10 (160° C.) [min] | 2.2 | 2.2 |
| | T50 (160° C.) [min] | 3.7 | 3.8 |
| | T90 (160° C.) [min] | 7.4 | 7.8 |

TABLE 2-continued

| TEST GRADE | | Comp. Ex. 2 | Ex. 7 |
|---|---|---|---|
| Tensile property test (ASTM D412) | Hd's (shore A) | 55.0 | 55.0 |
| | M100% (kgf/cm$^2$) | 12.9 | 14.5 |
| | M200% (kgf/cm$^2$) | 28.4 | 33.3 |
| | M300% (kgf/cm$^2$) | 52.3 | 59.8 |
| | Tb (kgf/cm$^2$) | 169.5 | 175.9 |
| | Elongation (%) | 745.4 | 721.1 |
| | Tear strength (kgf/mm) | 5.6 | 5.7 |
| Cut & Chip | weight loss (mg) | 2345.0 | 2373.0 |
| DIN abrasion | weight loss (mg) | 433.0 | 446.0 |

Table 2 shows that the peptizer-functionalized trans polybutadiene prepared in Example 7 is superior to the conventional trans polybutadiene prepared in Comparative Example 2 in processability and tensile properties.

As described above, a high 1,4-trans polybutadiene prepared according to the present invention comprises an aromatic organosulfur compound bound to the polymeric chain. This organosulfur molecule existing in molecule chain decreases ultra high polymer region and narrows molecular weight distribution, while remarkably improving processability and physical properties.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A 1,4-trans polybutadiene of Formula 1, which is grafted with an aromatic organosulfur compound:

[Formula 1]

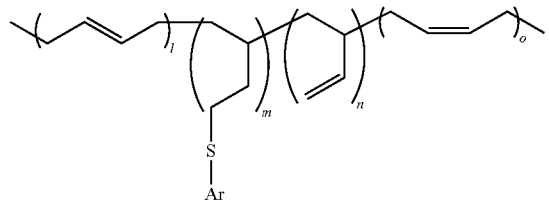

wherein l, m, n and o are repeating units of the main chain of the polybutadiene;
the content of the

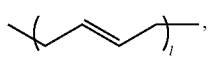, the

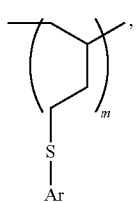

the

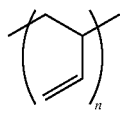

and the

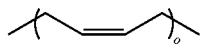

is 70-90 wt %, 0.05-5 wt %, 0-20 wt % and 0.1-10 wt %, respectively; and
wherein —S—Ar is an aromatic organosulfur group.

2. The 1,4-trans polybutadiene of claim 1, which has a molecular weight of Mw: 50,000-2,000,000.

3. A process of preparing a 1,4-trans polybutadiene having a molecular weight of Mw: 50,000-2,000,000 grafted with an aromatic organosulfur compound, the process comprising:

(a) preparing a 1,4-trans polybutadiene by polymerizing 1,3-butadiene or butadiene derivatives in a nonpolar solvent in the presence of a catalyst comprising a two-phase catalyst or a three-phase catalyst, wherein the two-phase catalyst comprises 3-100 moles of a monomeric organoaluminum compound relative to one mole of a cobalt compound, and the three-phase catalyst comprises 1-10 moles of a phenol-based compound and 10-100 moles of an oligomeric organoaluminum compound relative to one mole of a cobalt compound; and (b) preparing the 1,4-trans polybutadiene grafted with an aromatic organosulfur compound by reacting the 1,4-trans polybutadiene with an aromatic organosulfur compound:

[Formula 1]

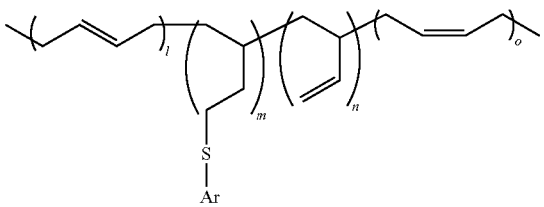

wherein l, m, n and o are repeating units of the main, chain of the polybutadiene;
the content of the

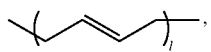, the

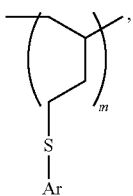

the

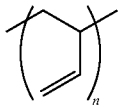

and the

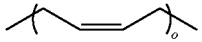

is 70-90 wt %, 0.05-5 wt %, 0-20 wt % and 0.1-10 wt %, respectively;

wherein —S—Ar is an aromatic organosulfur group; and wherein the aromatic organosulfur compound is selected from:
halogen thiophenol, halogen thiopyridine, xylylmercaptan, tetrachlorobenzenedithiol, mercaptobenzothiazole, glycidyl pentachlorothiophenyl ether, glycidyl pentafluorothiophenyl ether, dibenzarnidodiphenyldisulfide, and zinc pentachlorothiophenol.

4. The process of claim 3, wherein the nonpolar solvent is selected from the group consisting of butane, pentane, hexane, isopentane, heptane, octane, isooctane, cyclopentane, methylcyclopentane, cyclohexane, methylcyclohexane, ethylcyclohexane, be toluene, ethylbenzene and xylene.

5. The process of claim 3, wherein the nonpolar solvent is used in the amount of 3-10 weight ratio relative to the total weight of the reactants in the step (a).

6. The process of claim 3, wherein the catalyst is used in the amount of $1\times10^{-3}$-$1\times10^{-5}$, weight parts relative to 100 weight parts of the 1,3-butadiene or butadiene derivatives.

7. A rubber composition comprising the 1,4-trans polybutadiene grafted with an aromatic organosulfur compound of claim 1.

8. The 1,4-trans polybutadiene of claim 1, wherein the 1,4-trans polybutadiene is grafted to the aromatic organosulfur group by reacting the 1,4-trans polybutadiene with an aromatic organosulfur compound selected from:
halogen thiophenol, halogen thiopyridine, xylylmercaptan, tetrachlorobenzenedithiol, mercaptobenzothiazole, glycidyl pentachlotothiophenyl ether, glycidyl pentafluorothiophenyl ether, dibenzamidodiphenyldisuifide, and -zinc pentachlorothiophenol.

* * * * *